United States Patent
Loosier (10) Patent No.: US 10,278,383 B2
(45) Date of Patent: May 7, 2019

(54) WATERFOWL DECOY STAND

(71) Applicant: Dennis Loosier, Tyler, TX (US)

(72) Inventor: Dennis Loosier, Tyler, TX (US)

( * ) Notice: Subject to any disclaimer, the term of this patent is extended or adjusted under 35 U.S.C. 154(b) by 0 days.

(21) Appl. No.: 14/953,161

(22) Filed: Nov. 27, 2015

(65) Prior Publication Data
US 2016/0150773 A1  Jun. 2, 2016

Related U.S. Application Data

(60) Provisional application No. 62/085,328, filed on Nov. 27, 2014.

(51) Int. Cl.
*A01M 31/06* (2006.01)

(52) U.S. Cl.
CPC .................... *A01M 31/06* (2013.01)

(58) Field of Classification Search
CPC ..................................... A01M 31/06
USPC .......................................... 43/2, 3
See application file for complete search history.

(56) References Cited

U.S. PATENT DOCUMENTS

| | | | |
|---|---|---|---|
| 970,003 A | 9/1910 | Wethall | |
| 1,746,640 A * | 2/1930 | Emoff | A01M 31/06 43/3 |
| 2,246,574 A * | 6/1941 | Coe | A01M 31/06 43/3 |
| 2,616,200 A | 11/1952 | Milam | |
| 2,622,360 A * | 12/1952 | Bertram | A01M 31/06 43/3 |
| 2,952,090 A * | 9/1960 | Pittenger | A01M 31/06 43/3 |
| 4,120,110 A * | 10/1978 | Aeschliman | A01M 31/06 43/3 |
| 4,475,301 A * | 10/1984 | Wortham | A01K 97/04 43/17.5 |
| 4,660,313 A | 4/1987 | Bauernfeind et al. | |
| 6,655,071 B2 | 12/2003 | Barnes et al. | |
| 6,957,509 B2 * | 10/2005 | Wright | A01M 31/06 43/2 |
| 7,043,865 B1 * | 5/2006 | Crowe | A01M 31/06 43/3 |
| 7,789,043 B2 * | 9/2010 | Kania | A01G 9/00 119/209 |
| 7,941,962 B2 * | 5/2011 | Wood | A01M 31/06 43/3 |
| 7,975,422 B2 | 7/2011 | Elliott et al. | |
| 8,347,545 B2 * | 1/2013 | Ivie | A01M 31/06 43/2 |
| 8,506,339 B2 * | 8/2013 | Fletcher | A01M 31/06 43/3 |
| 8,793,923 B1 | 8/2014 | Heiges | |
| 8,887,433 B2 | 11/2014 | Luttrull | |

(Continued)

*Primary Examiner* — David J Parsley
(74) *Attorney, Agent, or Firm* — Daniel J. Chalker; Edwin S. Flores; Chalker Flores, LLP (57) ABSTRACT

A waterfowl decoy stand has an elongated base, a buoyant material attached to the top of the elongated base, and one or more studs attached to the top of the elongated base. The elongated base has a top, a bottom, a first elongated portion having a first end, and a second elongated portion having a second end. An angle formed by the first elongated portion and the second elongated portion is greater than 90 degrees and less than 180 degrees. The one or more studs extend above the buoyant material for removably retaining a waterfowl decoy.

7 Claims, 6 Drawing Sheets

(56) References Cited

U.S. PATENT DOCUMENTS

| | | | |
|---|---|---|---|
| 8,950,103 B2* | 2/2015 | Bullerdick | A01M 31/06 43/2 |
| 9,572,339 B1* | 2/2017 | Dicken | A01M 31/06 |
| 2013/0212924 A1 | 8/2013 | Shisko | |

* cited by examiner

WATERFOWL DECOY STAND

CROSS REFERENCE TO RELATED APPLICATIONS

The patent application claims priority to and is a non-provisional application of U.S. provisional patent application Ser. No. 62/085,328 filed on Nov. 27, 2014, which is hereby incorporated by reference in its entirety.

STATEMENT REGARDING FEDERALLY SPONSORED RESEARCH OR DEVELOPMENT

Not Applicable.

NAMES OF THE PARTIES TO A JOINT RESEARCH AGREEMENT

Not Applicable.

INCORPORATION-BY-REFERENCE OF MATERIAL SUBMITTED ON A COMPACT DISC

Not Applicable.

FIELD OF THE INVENTION

This disclosure relates in general to decoy stands and floating decoy systems used to attract waterfowl.

BACKGROUND ART

Typically waterfowl decoys are designed to be placed on or near ground or float on water. Land-based decoys typically have a stud or stake that extends from the bottom of the decoy and is driven or pushed into the ground. Land-based decoys are not designed to float or operate in the water. But, these land-based decoys can sometimes be used in very shallow water if the stud or stake is long enough. Water-based decoys float on the surface of the water and are maintained in position with anchors or weights. Subsurface mounting structures can be used to position multiple decoys. As a result, hunters have to buy, carry and place both types of decoys.

BRIEF SUMMARY OF THE INVENTION

The present invention provides a waterfowl decoy stand that has numerous advantageous features. For example, the waterfowl decoy stand allows hunters to use land-based decoys on the water, which reduces expense, weight and the time to set up the decoys. The waterfowl decoy stand can be textured and colored to resemble a log. Moreover, the waterfowl decoy stand has a boomerang shape or V-shape that reduces the rocking and tipping forces cause by waves.

One embodiment of the present invention provides a waterfowl decoy stand having an elongated base, a buoyant material attached to the top of the elongated base, and one or more studs attached to the top of the elongated base. The elongated base has a top, a bottom, a first elongated portion having a first end, and a second elongated portion having a second end. An angle formed by the first elongated portion and the second elongated portion is greater than 90 degrees and less than 180 degrees. The one or more studs extend above the buoyant material for removably retaining a waterfowl decoy.

Another embodiment of the present invention provides a waterfowl decoy stand having an elongated base, a buoyant material attached to the top of the elongated base, one or more pivot or swivel assemblies connected to the top of the elongated base and a stud attached to each pivot or swivel assembly. The elongated base has a top, a bottom, a first elongated portion having a first end, and a second elongated portion having a second end. An angle formed by the first elongated portion and the second elongated portion is greater than 109 degrees and less than 161 degrees. A longitudinal cavity is formed within a top of the buoyant material proximate to each stud. Each stud pivots, swings or folds from a first position to a second position. The first position is where the stud extends above the buoyant material for removably retaining a waterfowl decoy. The second position is where the stud is disposed within the longitudinal cavity.

Technical advantages of certain embodiments will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE SEVERAL VIEWS OF THE DRAWINGS

For a more complete understanding of the present disclosure and its advantages, reference is now made to the following description, taken in conjunction with the accompanying drawings, in which.

DETAILED DESCRIPTION OF THE INVENTION

The present invention provides a waterfowl decoy stand that has numerous advantageous features. For example, the waterfowl decoy stand allows hunters to use land-based decoys on the water, which reduces expense, weight and the time to set up the decoys. The waterfowl decoy stand can be textured and colored to resemble a log or piece of wood. Moreover, the waterfowl decoy stand has a boomerang shape or V-shape that reduces the rocking and tipping forces cause by waves. The waterfowl decoy stand is primarily designed for floating in a body of water, but can be used in a swamp, marsh or on the ground. Note that the waterfowl decoy stand is not limited to use with waterfowl decoys, but can be used to place decoys of other types of animals.

One embodiment of the present invention provides a waterfowl decoy stand having an elongated base, a buoyant material attached to the top of the elongated base, and one or more studs attached to the top of the elongated base. The elongated base has a top, a bottom, a first elongated portion having a first end, and a second elongated portion having a second end. The elongated base is boomerang shaped or V-shaped, such that an angle formed by the first elongated portion and the second elongated portion can be greater than 90 degrees and less than 180 degrees. Alternatively, the angle can be greater than 109 degrees and less than 161 degrees. For example, the angle can be approximately 140 degrees. The elongated base can be made of aluminum, rubber, plastic or other suitable material. The buoyant material can be made of high density foam, plastic or other suitable material. The buoyant material can be textured and colored to resemble a log or other floating item found in nature.

The one or more studs extend above the buoyant material for removably retaining a waterfowl decoy. This provides the appearance of one or more waterfowl decoys standing or sitting atop a log (i.e., the stand). In addition, a connector is attached to the first end, the second end or both the first and second ends of the elongated base. The studs can be retractable using any suitable configuration, mechanism or assembly (e.g., a pivot or swivel assembly connecting the stud to the elongated base, etc.). For example, a longitudinal cavity can be formed within a top of the buoyant material proximate to each stud, and each stud pivots, swings or folds into the longitudinal cavity. A locking mechanism can be used to maintain the stud in one or more positions. The waterfowl decoy stand may also include a carrying strap that removably connects to one or more of the connectors, and/or an anchor or weight removably attached to the one or more connectors Various non-limiting embodiments of the present invention will now be described in reference to the figures. Note that the angles, dimensions and measurements shown in the figures are merely examples and do not limit the scope of the claims in any way. As will be appreciated by those skilled in the art, the angles, dimensions and measurements shown in the figures can be modified as desired.

Figure 1:
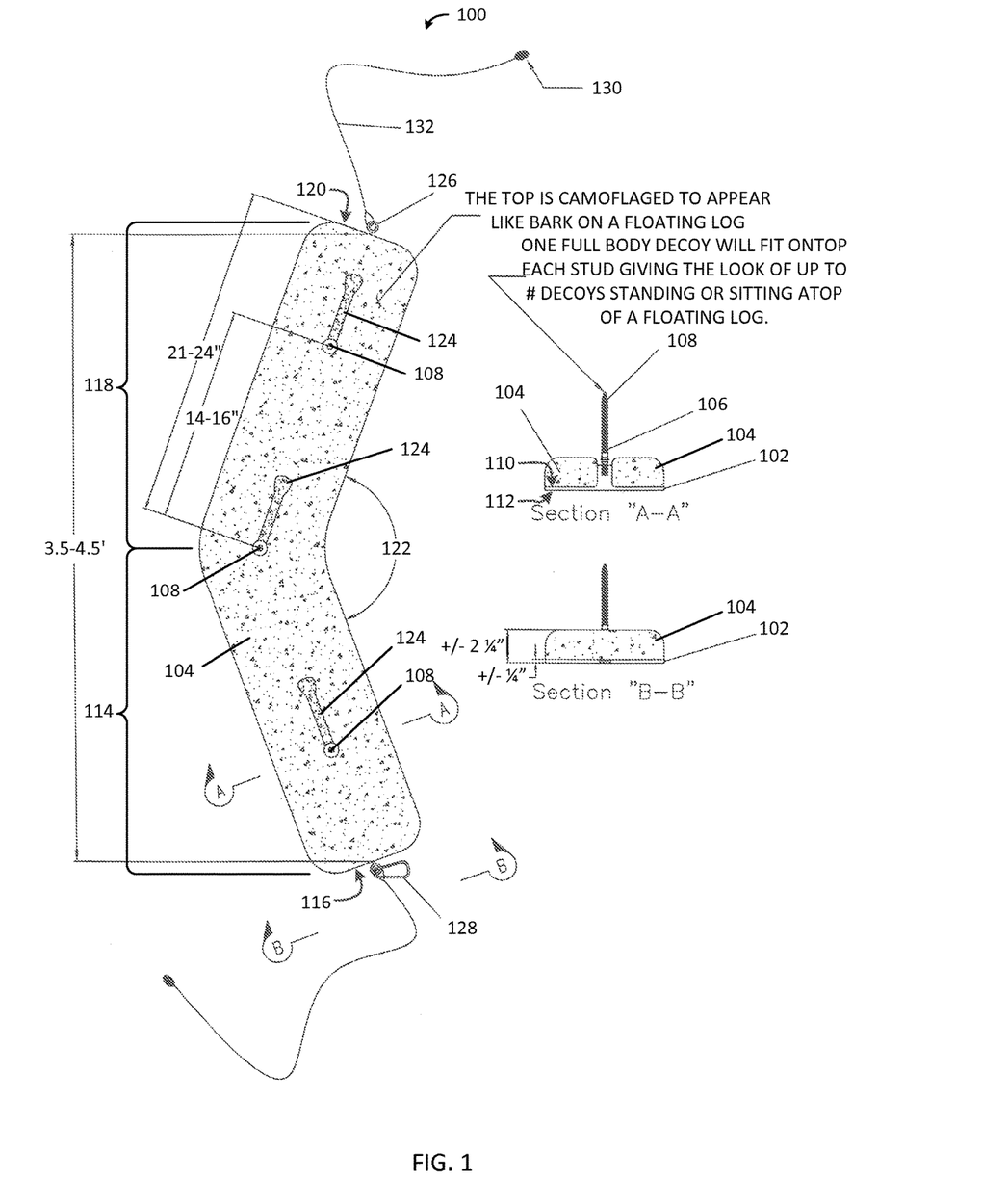
FIG. 1 is a top view of waterfowl decoy stand in accordance with one embodiment of the present invention.

Now referring to FIG. 1, a top view of waterfowl decoy stand 100 in accordance with one embodiment of the present invention is shown. The waterfowl decoy stand 100 has an elongated base 102, a buoyant material 104 attached to a top 110 of the elongated base 102, one or more pivot or swivel assemblies 106 connected to the top 110 of the elongated base 102 and a stud, post or rod 108 attached to each pivot or swivel assembly 106. The elongated base 102 has a top 110, a bottom 112, a first elongated portion 114 having a first end 116, and a second elongated portion 118 having a second end 120. The elongated base 102 is boomerang shaped or V-shaped, such that an angle 122 formed by the first elongated portion 114 and the second elongated portion 118 can be greater than 109 degrees and less than 161 degrees.

For example, the angle 122 can be approximately 140 degrees. As a result, the angle 122 can be 110, 111, 112, 113, 114, 115, 116, 117, 118, 119, 120, 121, 122, 123, 124, 125, 126, 127, 128, 129, 130, 131, 132, 133, 134, 135, 136, 137, 138, 139, 140, 141, 142, 143, 144, 145, 146, 147, 148, 149, 150, 151, 152, 153, 154, 155, 156, 157, 158, 159 or 160 degrees or other incremental angle between. Alternatively, the first elongated portion 114 and the second elongated portion 118 can be joined together at a pivot point such that the angle 122 is adjustable. In such a case, the angle 122 could be adjustable between 90 and 180 degrees. The elongated base 102 can be made of aluminum, rubber, plastic or other suitable material. The buoyant material 104 can be made of high density foam, plastic or other suitable material. The buoyant material 104 can be textured and colored to resemble a log or other floating item found in nature (e.g., camouflage that appears to be bark like a floating log, etc.). Moreover, the buoyant material 104 can encapsulate or partially encapsulate the elongated base 102 such that the elongated base 102 is disposed or substantially disposed within the buoyant material 104 as long as the waterfowl decoy stand 100 will remain upright under normal operating conditions.

Figure 3A:
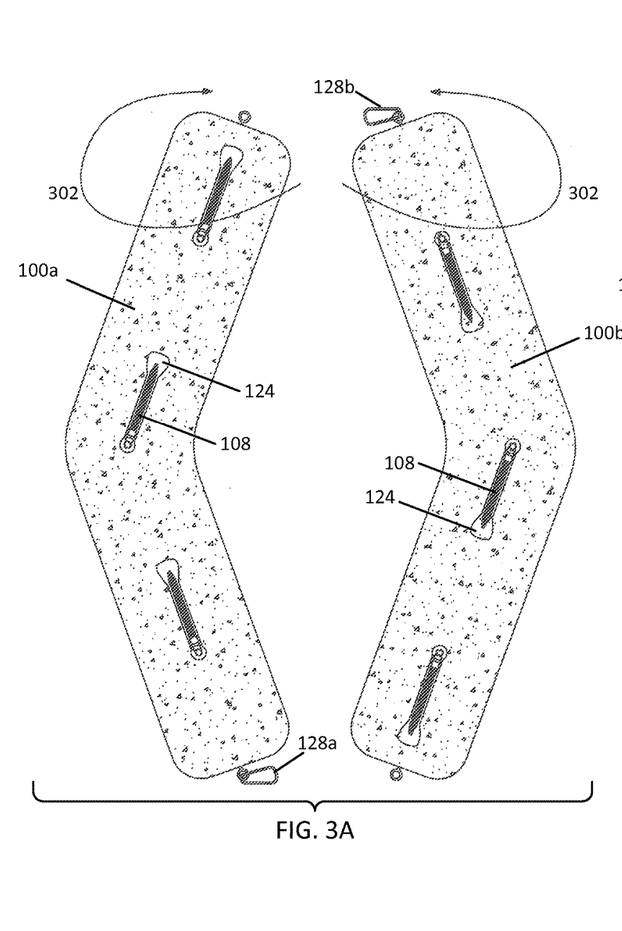
FIGS. 3A-3B illustrate how two waterfowl decoy stands are linked together for carrying or storage in accordance with one embodiment of the present invention.
Figure 3B:
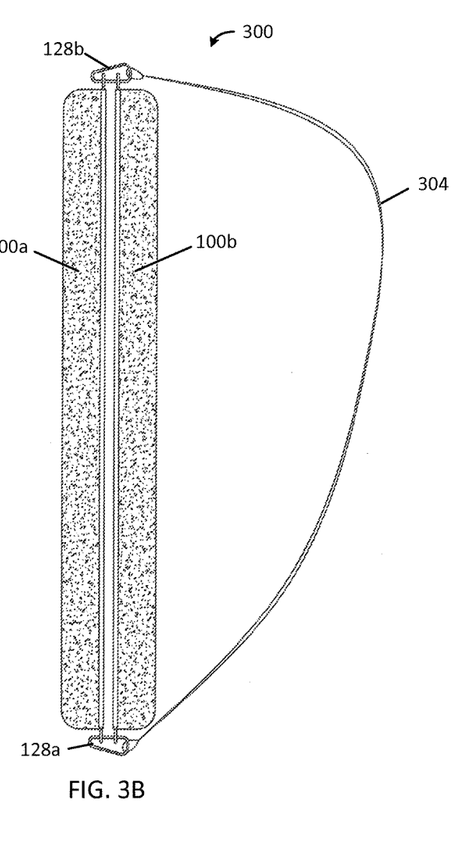

A longitudinal cavity 124 is formed within a top of the buoyant material 104 proximate to each stud 108. The longitudinal cavity 124 can be shaped as desired to allow each stud 108 to pivot, swing or fold from a first position (FIG. 1) to a second position (FIGS. 3A-3B). The first position is where the stud 108 extends above the buoyant material 104 for removably retaining a waterfowl decoy (not shown). The second position is where the stud 108 is disposed within the longitudinal cavity 124. The location and angle of the longitudinal cavity 124 within the buoyant material 104 shown in the figures are non-limiting examples. Other locations and angles can be used. Likewise, the orientation of the stud 108 within the longitudinal cavity 124 shown in the figures is a non-limiting example. Other orientations can be used. In some embodiments, a locking mechanism (e.g., spring, latch, spring loaded detent pin, etc.) can be used to maintain the stud 108 in the first position or the second position.

In addition, a connector 126 (e.g., stainless steel eye hook or eyelet, etc.) can be attached to or molded into the first end, the second end or both the first and second ends of the elongated base. A tether 132 (e.g., #5, ⅛" stranded wire, etc.) and sinker/weight 130 (e.g., 1 ounce, etc.) can be attached to the connectors 126 to maintain the position of the waterfowl decoy stand 100 in the water. A D-ring or eyehook 128 can also be attached to the connectors 126 to attach multiple waterfowl decoys 100 together in the water (e.g., FIG. 2A-2B), or for storage or transport of the waterfowl decoy stand 100 (e.g., FIG. 3A-3B), or other desired use.

Figure 2A:
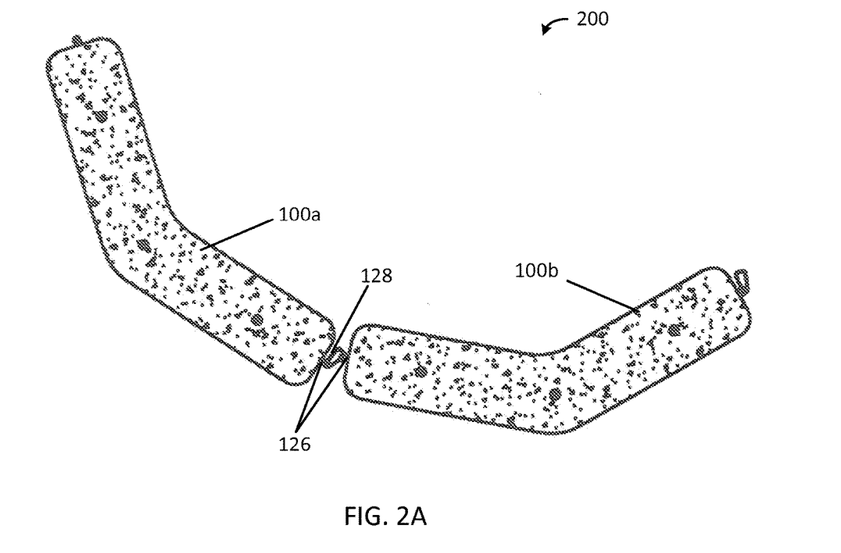
FIGS. 2A-2B are top views of an assembly of waterfowl decoy stands in accordance with one embodiment of the present invention.
Figure 2B:
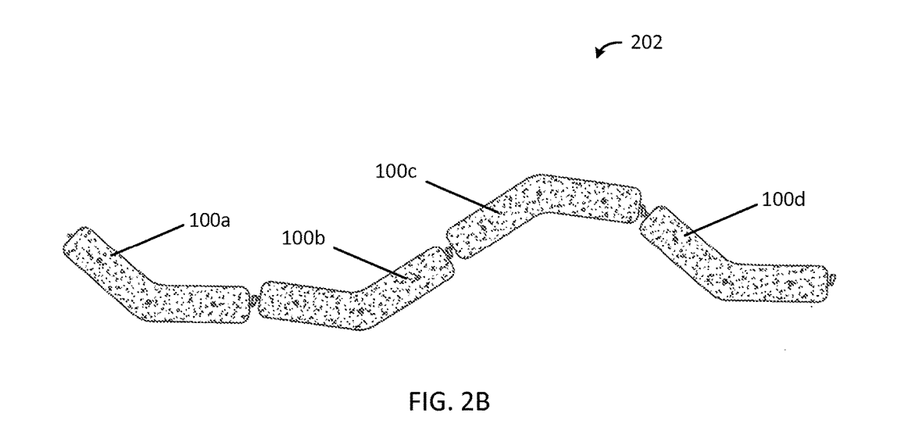

Referring now to FIGS. 2A-2B, top views of an assembly of waterfowl decoy stands in accordance with one embodiment of the present invention are shown.

The waterfowl decoy stands can be connected together with D-rings 128 attached to the connectors 126 made of aluminum or other suitable material. This allows a hunter to arrange the waterfowl decoy stands 100 in an endless number of configurations. For example, FIG. 2A depicts a configuration 200 with two waterfowl decoy stands 100a and 100b connected together. Similarly, FIG. 2B depicts a configuration 202 with four waterfowl decoy stands 100a, 100b, 100c and 100d connected together.

Now referring to FIGS. 3A-3B, two waterfowl decoy stands 100a and 100b are linked together for carrying or storage in accordance with one embodiment of the present invention. The waterfowl decoy stands 100a and 110b are connected base-to-base (indicated by arrows 302) with D-ring/eyehooks 128a and 128b on each end. Each decoy stud, post or rod 108 is folded over and down into the longitudinal cavity 124 in the buoyant material 104. The assembly 300 (100a and 100b) can be easily carried by attaching a shoulder strap 304 to the D-ring/eyehooks 128a and 128b on each end. The shoulder strap 304 can be combined with the tethers 132 (FIG. 1). Other types of connectors and straps can be used.

Referring now to FIGS. 4A-4D, top, side, end and perspective views of a waterfowl decoy stand 400 in accordance with another embodiment of the present invention are shown. The waterfowl decoy stand 400 has an elongated base 102, a buoyant material 104 attached to a top of the elongated base 102, one or more pivot or swivel assemblies 402 connected to the top of the elongated base 102 and a stud, post or rod 108 attached to each pivot or swivel assembly 402. The elongated base 102 is boomerang shaped or V-shaped having an angle 122 that can be greater than 109 degrees and less than 161 degrees.

For example, the angle 122 can be approximately 140 degrees. As a result, the angle 122 can be 110, 111, 112, 113, 114, 115, 116, 117, 118, 119, 120, 121, 122, 123, 124, 125, 126, 127, 128, 129, 130, 131, 132, 133, 134, 135, 136, 137, 138, 139, 140, 141, 142, 143, 144, 145, 146, 147, 148, 149, 150, 151, 152, 153, 154, 155, 156, 157, 158, 159 or 160 degrees or other incremental angle between. The elongated base 102 can be made of aluminum, rubber, plastic or other suitable material. The buoyant material 104 can be made of high density foam, plastic or other suitable material. The buoyant material 104 can be textured and colored to resemble a log or other floating item found in nature (e.g., camouflage that appears to be bark like a floating log, etc.). Moreover, the buoyant material 104 can encapsulate or partially encapsulate the elongated base 102 such that the elongated base 102 is disposed or substantially disposed within the buoyant material 104 as long as the waterfowl decoy stand 400 will remain upright under normal operating conditions.

Figure 4A:
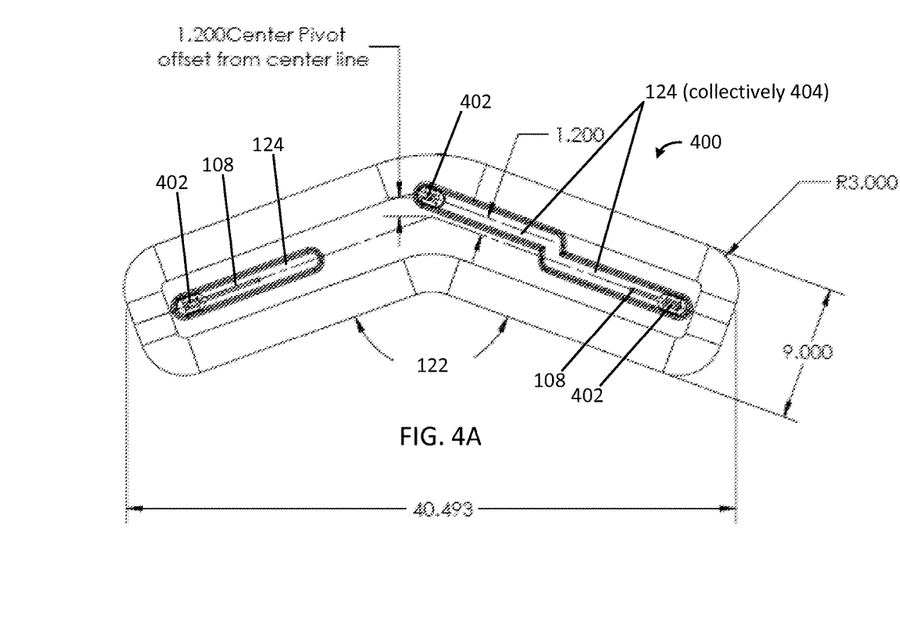
FIGS. 4A-4D are top, side, end and perspective views of a waterfowl decoy stand in accordance with another embodiment of the present invention.
Figure 4B:
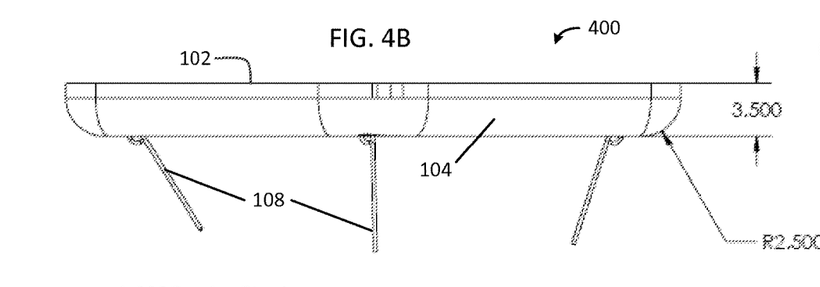
Figure 4C:
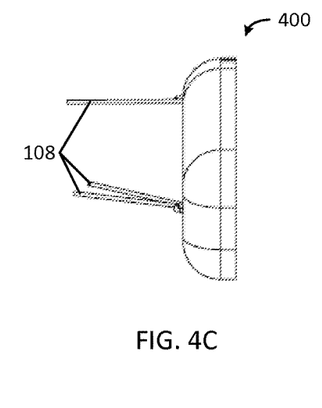
Figure 4D:
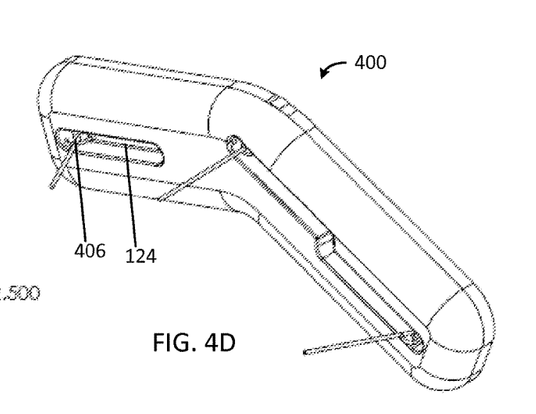
Figures 5A, 5B, 5C, 5D:
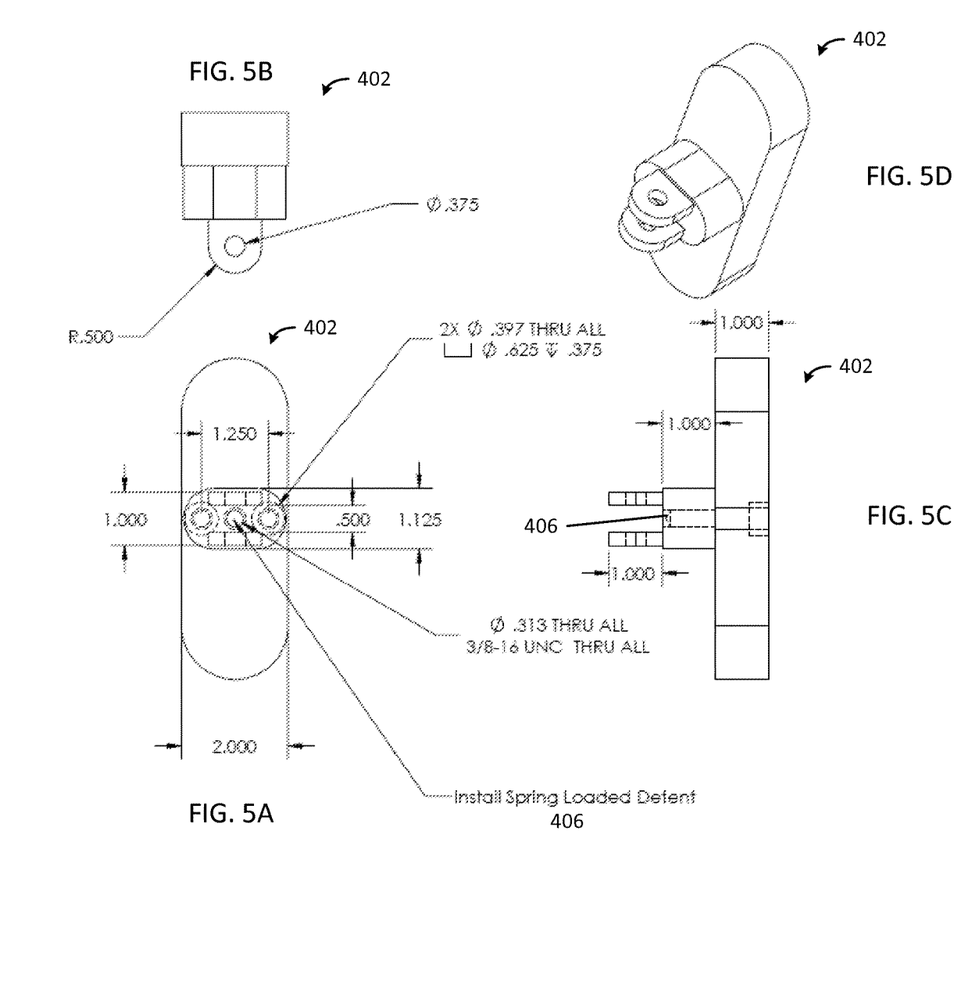
FIGS. 5A-5D are top, side, end and perspective views of a pivot or swivel assembly in accordance with another embodiment of the present invention.
Figure 6A:
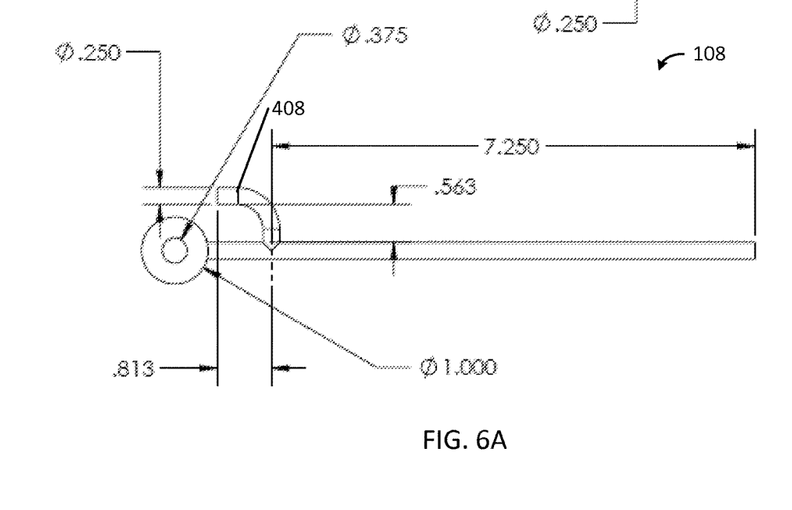
FIGS. 6A-6D are top, side, end and perspective views of a stud, post or rod in accordance with another embodiment of the present invention.
Figure 6B:
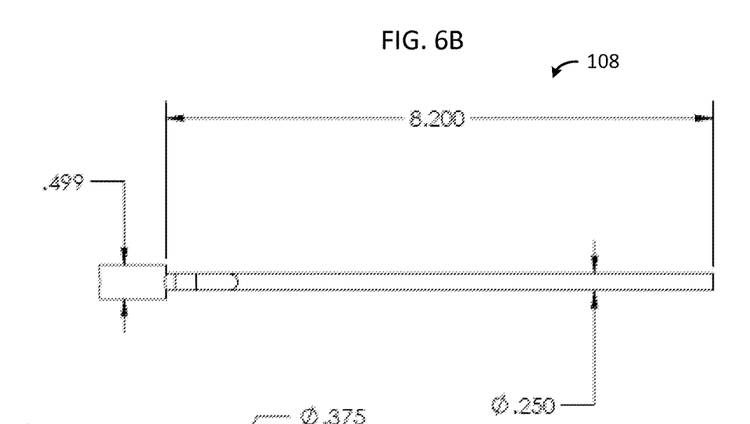
Figure 6C:
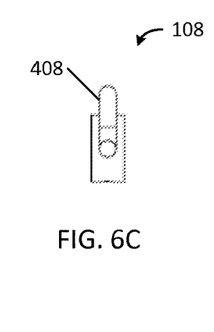
Figure 6D:
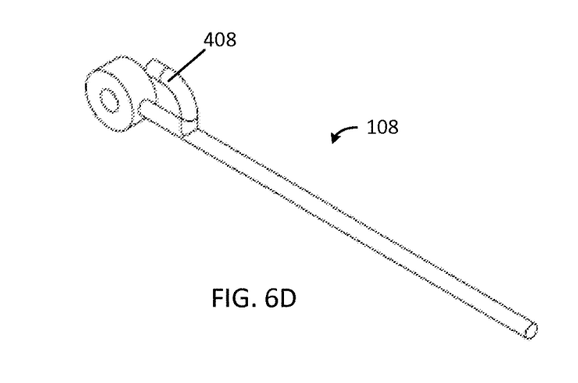

A longitudinal cavity 124 is formed within a top of the buoyant material 104 proximate to each stud 108. The longitudinal cavity 124 can be shaped as desired to allow each stud 108 to pivot, swing or fold from a first position (FIGS. 4B-4D) to a second position (FIG. 4A). As shown, two of the longitudinal cavities 124 are combined together to from a single cavity 404 for the two of the studs 108. The first position is where the stud 108 extends above the buoyant material 104 for removably retaining a waterfowl decoy (not shown). The second position is where the stud 108 is disposed within the longitudinal cavity 124. The location and angle of the longitudinal cavity 124 within the buoyant material 104 shown in the figures are non-limiting examples. Other locations and angles can be used. Likewise, the orientation of the stud 108 within the longitudinal cavity 124 shown in the figures is a non-limiting example. Other orientations can be used.

Now referring to FIGS. 5A-5D, top, side, end and perspective views of a pivot or swivel assembly 402 in accordance with another embodiment of the present invention are shown. This pivot or swivel assembly 402 includes a locking mechanism 406 (i.e., spring loaded detent pin) that is used to maintain the stud 108 in the first position or the second position.

Referring now to FIGS. 6A-6D, top, side, end and perspective views of a stud, post or rod 108 in accordance with another embodiment of the present invention are shown. This stud, post or rod 108 includes a handle or tab 408 that can be used to easily move stud 108 from the first position to the second position and vice versa.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A waterfowl decoy stand comprising:
    a single-piece elongated base having a top, a bottom, a first elongated portion having a first end, and a second elongated portion having a second end, wherein an angle formed by the first elongated portion and the second elongated portion is greater than 109 degrees and less than 161 degrees;
    a buoyant material attached only on the top of the elongated base, wherein the buoyant material is textured and colored to resemble a log;
    three pivot or swivel assemblies connected on the top of the elongated base, wherein a first pivot or swivel assembly is located proximate to the first end of the first elongated portion, a second pivot or swivel assembly is located proximate to the second end of the second end of the second elongated portion, and a third pivot or swivel assembly is located proximate to a center of the elongated base;
    a stud attached to each pivot or swivel assembly;
    a longitudinal cavity formed within a top of the buoyant material proximate to each stud, the longitudinal cavity having a bottom and a plurality of cavity walls enclosing the longitudinal cavity, and the longitudinal cavity is above the top of the elongated base; and
    each stud pivots, swings or folds from a first position to a second position, wherein the first position comprises the stud extending above the buoyant material for removably retaining a waterfowl decoy and the second position comprises the stud disposed within the longitudinal cavity such that the stud is surrounded by the plurality of cavity walls and the stud is positioned above the top of the elongated base at all times.

2. The waterfowl decoy stand as recited in claim 1, wherein the elongated base is boomerang shaped or V-shaped.

3. The waterfowl decoy stand as recited in claim 1, wherein the angle is approximately 140 degrees.

4. The waterfowl decoy stand as recited in claim 1, wherein each pivot or swivel assembly further comprises a locking mechanism to maintain the stud in the first position or the second position.

5. The waterfowl decoy stand as recited in claim 1, further comprising a connector attached to the first end, the second end or both the first and second ends of the elongated base.

6. The waterfowl decoy stand as recited in claim 5, further comprising:
   a carrying strap that removably connects to one or more of the connectors; or
   an anchor or weight removably attached to the one or more connectors.

7. The waterfowl decoy stand as recited in claim 1, wherein:
   the elongated base is made of aluminum, rubber or plastic;
   the buoyant material is made of high density foam or plastic; or
   the buoyant material or partially encapsulates the elongated base.

* * * * *